(12) United States Patent
Wang

(10) Patent No.: US 11,119,547 B2
(45) Date of Patent: Sep. 14, 2021

(54) SYSTEM AND METHOD FOR QUALIFYING A POWER-ON SEQUENCE BASED ON FEEDBACK

(71) Applicant: DELL PRODUCTS, LP, Round Rock, TX (US)

(72) Inventor: Isaac Qin Wang, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 152 days.

(21) Appl. No.: 16/536,749

(22) Filed: Aug. 9, 2019

(65) Prior Publication Data

US 2021/0041903 A1    Feb. 11, 2021

(51) Int. Cl.
| | |
|---|---|
| *G06F 1/26* | (2006.01) |
| *G05F 1/66* | (2006.01) |
| *G05B 15/02* | (2006.01) |
| *G05B 19/05* | (2006.01) |

(52) U.S. Cl.
CPC ............... *G06F 1/26* (2013.01); *G05B 15/02* (2013.01); *G05F 1/66* (2013.01); *G05B 19/05* (2013.01)

(58) Field of Classification Search
CPC .......... G05B 15/02; G05B 19/05; G05F 1/66; G06F 1/32; G06F 1/26; G06F 1/3234
USPC ........................................................ 713/330
See application file for complete search history.

(56) References Cited

U.S. PATENT DOCUMENTS

| | | | |
|---|---|---|---|
| 5,530,878 A * | 6/1996 | Bauer | G06F 1/305 |
| | | | 713/310 |
| 5,757,168 A * | 5/1998 | DeVale | G05F 1/44 |
| | | | 323/235 |
| 9,474,181 B2 | 10/2016 | Bailey et al. | |
| 9,625,974 B2 | 4/2017 | Bailey et al. | |
| 9,753,520 B2 | 9/2017 | Bailey et al. | |
| 9,870,334 B2 | 1/2018 | Hartman et al. | |
| 10,140,238 B2 | 11/2018 | Mundt et al. | |
| 10,229,027 B2 | 3/2019 | Luo et al. | |
| 2009/0256541 A1 * | 10/2009 | Akyildiz | G06F 1/26 |
| | | | 323/283 |
| 2010/0096924 A1 * | 4/2010 | Zhu | H02J 7/32 |
| | | | 307/32 |
| 2013/0132741 A1 * | 5/2013 | Chen | G06F 1/26 |
| | | | 713/300 |
| 2015/0113294 A1 | 4/2015 | Zhang et al. | |
| 2015/0130533 A1 * | 5/2015 | Jeon | G11C 5/147 |
| | | | 327/540 |
| 2015/0177813 A1 | 6/2015 | Bailey et al. | |
| 2015/0177814 A1 | 6/2015 | Bailey et al. | |

(Continued)

*Primary Examiner* — Chun Cao
(74) *Attorney, Agent, or Firm* — Larson Newman, LLP

(57) ABSTRACT

An information handling system includes a voltage regulator, a device, and a controller. The voltage regulator provides an output voltage to power on the device. The controller includes a voltage enable sense line. The controller provides a signal to enable the voltage regulator on the voltage enable sense line at a first voltage associated with a first state. The controller also monitors a voltage level on the voltage enable sense line, and determines whether the voltage level of the voltage enable sense line has changed to a second voltage level associated with a second state. In response to the voltage level on the voltage enable sense line changing to the second voltage level, the controller detects that the output voltage is fully turned on and provided to the device.

20 Claims, 7 Drawing Sheets

(56) References Cited

U.S. PATENT DOCUMENTS

2019/0199210 A1\* 6/2019 Shao .................. H02M 3/1588
2020/0044553 A1\* 2/2020 Guo ...................... G01R 31/42

\* cited by examiner

SYSTEM AND METHOD FOR QUALIFYING A POWER-ON SEQUENCE BASED ON FEEDBACK

FIELD OF THE DISCLOSURE

The present disclosure generally relates to information handling systems, and more particularly relates to qualifying a power-on sequence based on feedback.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A voltage regulator may provide an output voltage to power on a device of an information handling system. A controller may provide a signal to enable the voltage regulator on a voltage enable sense line at a first voltage associated with a first state. The controller also may monitor a voltage level on the voltage enable sense line, and may determine whether the voltage level of the voltage enable sense line has changed to a second voltage level associated with a second state. If the voltage level on the voltage enable sense line changing to the second voltage level, then the controller may detect that the output voltage is fully turned on and provided to the device.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
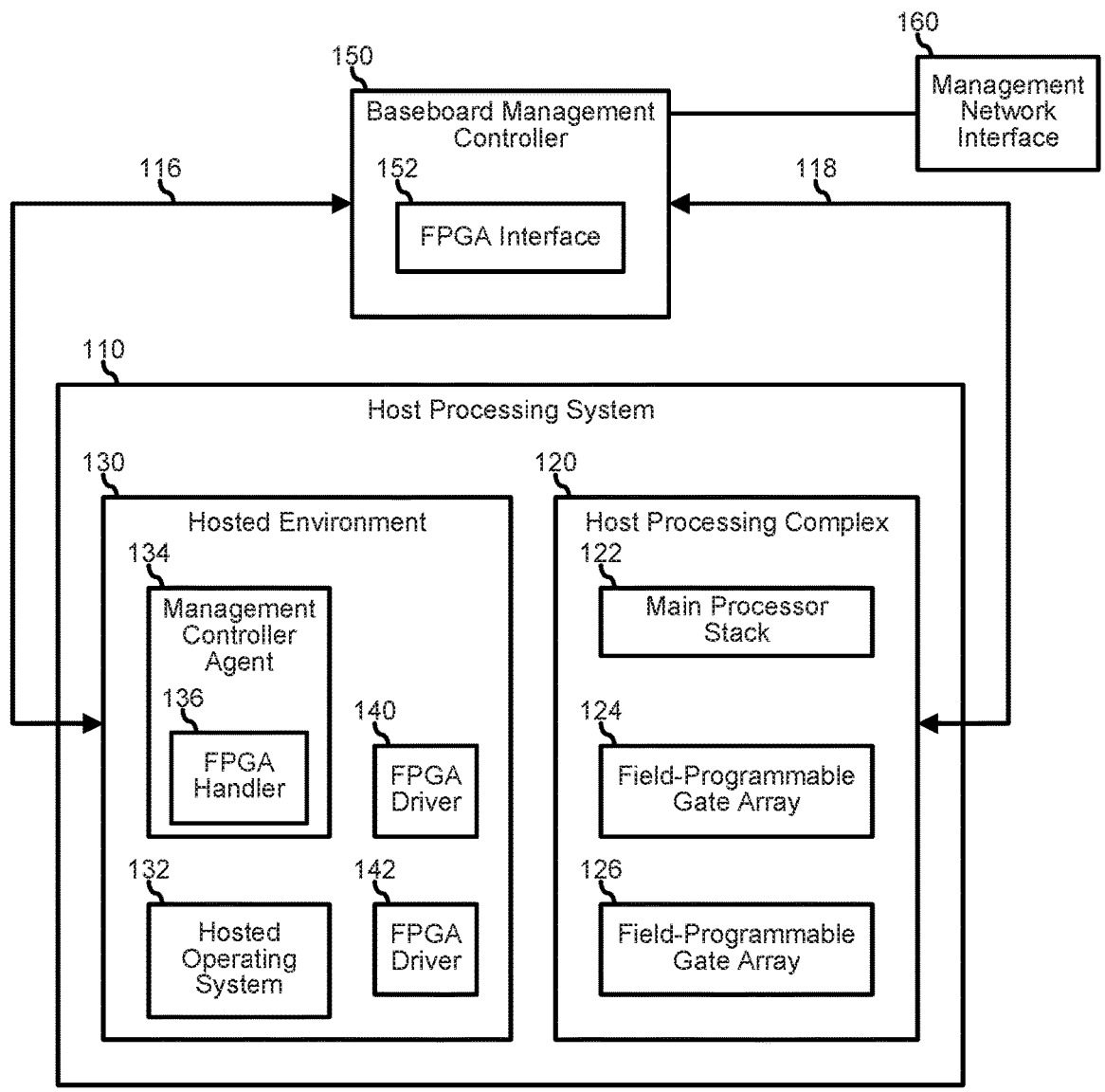
FIG. 1 is a block diagram of an information handling system according to an embodiment of the present disclosure.

FIG. 1 illustrates an information handling system 100 including a host processing system 110, a baseboard management controller (BMC) 150, and a management network interface 160. Host processing system 110 includes a host processing complex 120 and a hosted environment 130. Host processing complex 120 represents the main processing elements of information handling system 100, including a main processor stack 122, and field-programmable gate arrays (FPGAs) 124 and 126. Main processor stack 122 represents hardware including one or more processors, chipset elements, storage devices, memory devices, I/O devices, and the like. FPGAs 124 and 126 represent processing resources of host processing complex 120 that can be utilized to offload main processor stack 122 from various functions as needed or desired.

Hosted environment 130 includes a hosted OS 132, a BMC agent 134, and FPGA drivers 140 and 142. Hosted environment 130 represents a processing environment instantiated in code on host processing complex 120, and can include a BIOS or UEFI for information handling system 100, other firmware, device drivers, and the like, that establish the core operating code for establishing the hosted environment, and to launch hosted OS 132 on the host processing complex. Hosted OS 132 operates to manage the runtime aspects of hosted environment 130, to launch programs and applications on host processing complex 120, and to launch, manage, maintain, and halt tasks on FPGAs 124 and 126. FPGA drivers 140 and 142 operate to control FPGAs 124 and 126, and to provide an interface to enable hosted OS 132 and other components of hosted environment 130 to access the FPGAs. In a particular embodiment, one or more of FPGAs 124 and 126 include vendor specific functions and features for configuring, monitoring, and controlling the FPGAs. Such vendor specific functions and features are accessible to hosted environment 130 via FPGA drivers 140 and 142.

BMC 150 is connected via an interface 116 to interact with various functions and features of hosted environment 130, and is connected via an out-of-band interface 118 to interact with various functions and features of host processing complex 120. In particular, BMC 150 interacts with the various functions and features of hosted environment 130 via a management system agent 134 that is instantiated in the hosted environment to permit a user connected to the BMC to obtain status information from the pre-boot and runtime elements of the hosted environment, including the programs and applications instantiated in the hosted environment. The user can also provide commands and otherwise control the operations of the programs and applications, including directing hosted OS 132 to launch a program, application, or task, to modify the runtime operation of a program, application, or task, and to halt the execution of a program, application, or task, as needed or desired. Interface 116 represents a communication path between hosted environment 130 and BMC 150, as is known in the art, and can include a keyboard controller style (KCS) interface, a USB-NIC interface, an OS-to-BMC pass-through interface, or the like.

BMC 150 includes a FPGA interface module 152 that interacts with the various in-band functions and features of FPGA drivers 140 and 142 via a FPGA handler module 136 of management system agent 134 to permit the user to obtain status information from the tasks instantiated on FPGAs 124 and 126, and to access the in-band monitoring features of the FPGAs. FPGA interface module 152, interacting with FPGA handler module 136 also permits the user to provide commands and otherwise control the operations of FPGAs 124 and 126 or to manage the tasks running on the FPGAs, including directing hosted OS 132 to launch a task, to modify the runtime operation of a task, and to halt the execution of a task, as needed or desired.

BMC 150 also interacts out-of-band with the various functions and features of host processing complex 120. In particular, FPGA interface module 152 interacts out-of-band with FPGAs 124 and 126. For example, FPGA interface module 152 can receive out-of-band status information from FPGAs 124 and 126. Note that the status information that is available from FPGAs 124 and 126 via out-of-band interface 118 may be the same as, or different from the status information that is available from FPGA drivers 140 and 142, as may be determined by the particular FPGA vendor, or as otherwise dictated by design related choices, as needed or desired.

FPGA interface module 152 provides a management interface that permits a user that is connected to BMC 150 via management network interface 160 to select one or more of FPGAs 124 and 126, and to view the current operating status of the selected FPGA, such as by identifying the tasks currently being run on the selected FPGA, or the like, or by otherwise displaying information related to the status of the selected FPGA. Here, FPGA interface module 152 directs FPGA handler module 136 to retrieve the requested information from hosted environment 130, from hosted OS 132, or directly retrieves the requested information from the selected one of FPGAs 124 and 126 via out-of-band interface 118. FPGA interface module 152 then provides the retrieved information to the user.

Figure 2:
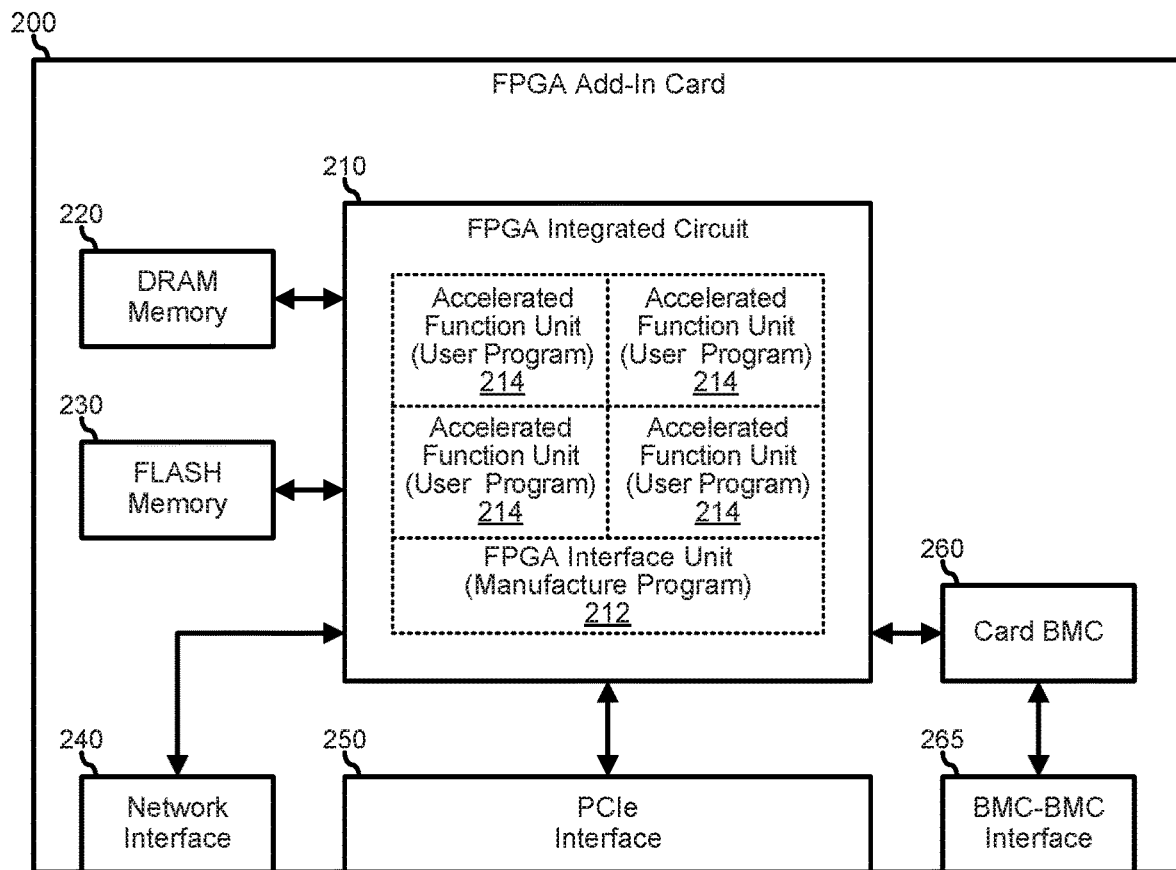
FIG. 2 is a block diagram detailing application and software level components of the information handling system of FIG. 1 according to at least one embodiment of the disclosure.

FPGAs are increasingly being utilized as high-performance accelerators in various server applications, where a typical server may employ one or more FPGAs. FIG. 2 illustrates a FPGA add-in card 200 that can be plugged into a communication interface of a server system. FPGA add-in card 200 includes a FPGA integrated circuit 210, one or more Dynamic Random Access Memory (DRAM) device 220, one or more FLASH memory device 230, a network interface 240, a PCIe interface 250, a card BMC 260, and a BMC-to-BMC interface 265. FPGA add-in card 200 provides the functions and features of a FPGA, but packaged so as to be easily incorporated into the architecture of an information handling system. FPGA integrated circuit 210 represents a FPGA device that is configured to provide hardware acceleration for various types of processing task and that is flexible to be configured to perform its intended processing tasks.

DRAM memory device 220 represents a volatile memory device that is accessible for storage of data to be consumed by, or produced by FPGA integrated circuit 210 or other functions of FPGA add-in card 200. Flash memory device 230 represents a non-volatile memory device for storing firmware for FPGA add-in card 200 and for storing other configuration information related to the FPGA add-in card. Network interface 240 represents a port for connecting to a network external to the information handling system into which FPGA add-in card 200 is installed. An example includes an Ethernet network, a Fibre Channel network, or another network, as needed or desired. In a particular embodiment, network interface 240 represents one or more Quad Small Form-Factor Pluggable (QSFP) modules. PCIe interface 250 represents a high-speed serial data interface in accordance with a PCIe specification. An example of PCIe interface 250 includes a four-lane (×4) link, an eight-lane (×8) link, a 16-lane (×16) link, or a link with another number of lanes as needed or desired. PCIe interface 250 represents a main data communication link between FPGA add-in card 200 and the information handling system into which the FPGA add-in card is installed for interacting with the programs and software instantiated in an operating system of the information handling system to perform the processing tasks as described below. Card BMC 260 represents a processor or controller of FPGA add-in card 200 for the monitoring, management, and maintenance of the functions and features of the FPGA add-in card. Card BMC 260 can operate in accordance with an Intelligent Platform Management Interface (IPMI) to provide the monitoring, managing, and maintaining of the functions and features out-of-band from an operating system instantiated on an information handling system into which FPGA add-in card 200 is installed. Here, card BMC 260 will typically be part of a management network of the information handling system that includes a BMC for the information handling system. Hence card BMC 260 will be connected to the system BMC via BMC-to-BMC interface 265. Thus BMC-to-BMC interface 265 operates to couple card BMC 260 to a management network of the information handling system for out-of-band communication between the card BMC and the elements of the information handling system. Examples of a management network interface may include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a Peripheral Component Interconnect-Express (PCIe) interface, a Network Controller Sideband Interface (NC-SI), or the like. As used herein, out-of-band access refers to operations performed apart from a BIOS/operating system execution environment on the information handling system, that is apart from the execution of code by processors of the information handling system and procedures that are implemented on the information handling system in response to the executed code.

FPGA integrated circuit 210 executes FPGA Interface Unit (FIU) program 212, which is provided by the manufacturer of the FPGA integrated circuit of FPGA add-in card 200 and one or more Accelerated Function Unit (AFU) 214, which is provided by a user of the information handling system into which FPGA add-in card 200 is installed. The FIU 212; also referred to as the "Blue Bit Stream" where FPGA add-in card 200 represents an FPGA add-in card manufactured by Intel Corp.; provides a platform interface layer between FPGA integrated circuit 210 and the other interfaces of FPGA add-in card 200, such as DRAM device 220, FLASH memory device 230, network interface 240, PCIe interface 250, and card BMC 260. The AFUs, also referred to as the "Green Bit Streams" where FPGA add-in card 200 represents an FPGA add-in card manufactured by Intel Corp., provide the user intellectual property (IP) that uniquely programs FPGA integrated circuit 210 to perform the intended processing tasks. The FIU 212 is pre-configured at the time of manufacture, and, with the exception of periodic firmware updates from the manufacturer of FPGA add-in card 200, is intended to stay unchanged during the life of the FPGA add-in card. On the other hand, the AFUs 214 are meant to be programmed in accordance with the desired processing task to be performed by FPGA add-in card 200. Hence FPGAs are referred to as being "field programmable." In this regard, the AFUs 214 may be programmed to FPGA during a system boot process of the information handling system into which FPGA add-in card 200 is installed, or during run time on an operating system instantiated on the information handling system, and FPGA integrated circuit 210 can be reprogrammed with different AFUs as needed or desired during the run time.

Figure 3:
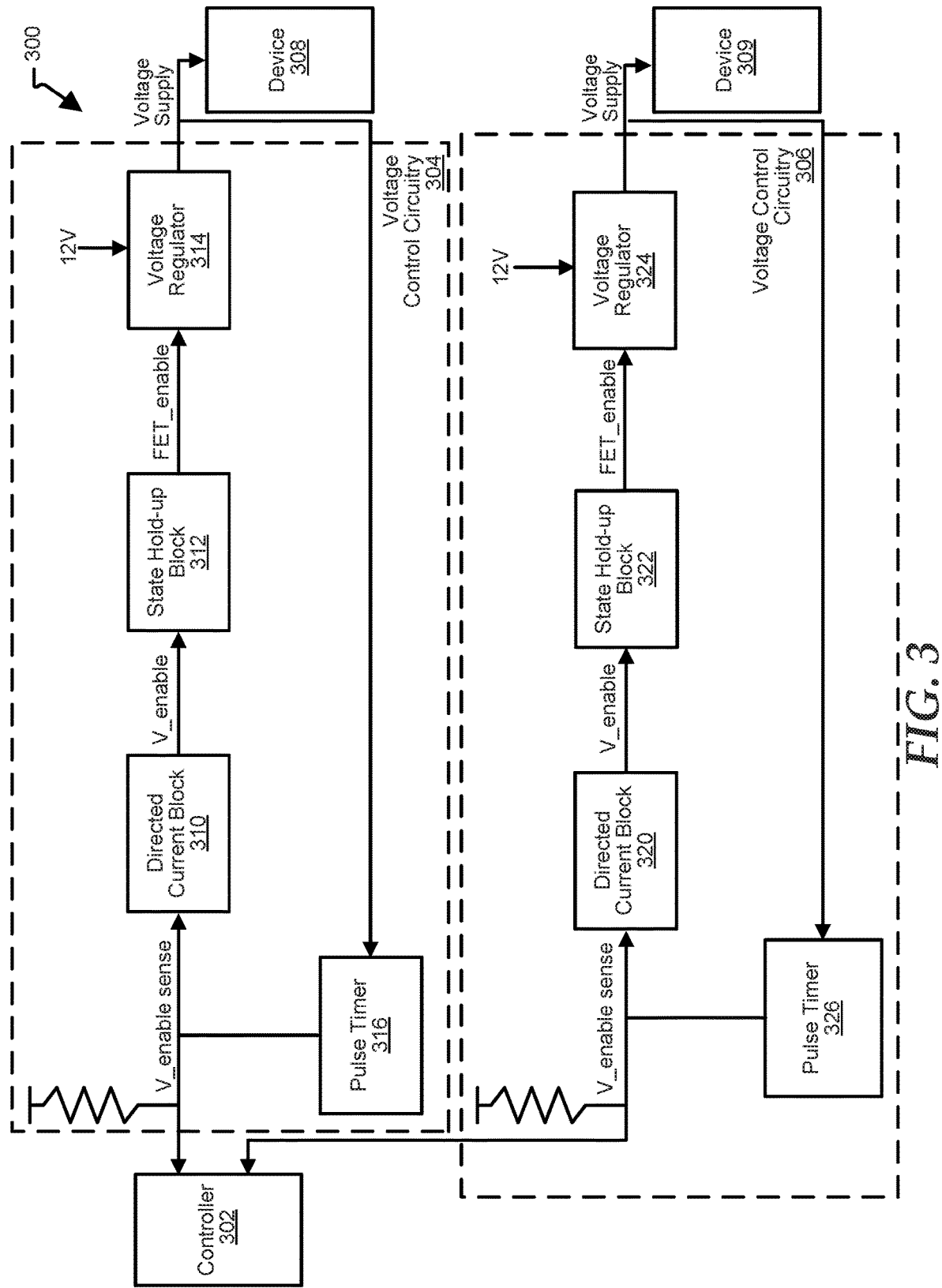
FIG. 3 is a block diagram of a portion of an information handling system according to at least one embodiment of the disclosure.

FIG. 3 shows a portion of an information handling system 300 including a controller 302, voltage supply circuitries 304 and 306, and devices 308 and 309. Voltage supply circuitry 304 includes a direct current block 310, a state hold-up block 312, a voltage regulator 314, and a pulse timer 316. Voltage supply circuitry 306 includes a directed current block 320, a state hold-up block 322, a voltage regulator 324, and a pulse timer 326. In an example, controller 302 may be any suitable device to control a power-on sequence to one or more other devices within information handling system 300. For example, controller 302 may be a complex programmable logic device (CPLD).

In an example, controller 302 may control the power up sequence for any suitable other device including, but not limited to, a network interface card (NIC), a graphics processing unit (GPU), a PCIe device, and a FGPA accelerator. For example, voltage regulator 314 may be used to provide an output voltage to device 308, and voltage regulator 324 may be used to provide an output voltage to device 309. In an example, voltage regulators 314 and 324 may be any suitable device including, but not limited to, a voltage regulator integrated circuit and a voltage transistor. In an example, device 308 may be FPGA 124 of FIG. 1 or FPGA add-in card 200 of FIG. 2, and device 308 may FPGA 126 of FIG. 1 or a second FPGA add-in card. In an example, voltage control circuitries 304 and 306 may operate in substantially the same manner, and may be coupled to different pins of controller 302. In an example, the portion of information handling system 300 shown in FIG. 3 may reside on a backplane, another information handling system or on a front plane of information handling system without varying from the scope of the disclosure. Information handling system 300 may include additional components (not shown in FIG. 3), without varying from the scope of this disclosure. For example, information handling system 300 may be incorporated within information handling system 100 of FIG. 1, such that controller 302 and voltage control circuitries 304 and 306 may power up FPGAs 124 and 126 of FIG. 1.

In an example, an inrush current may be induced when a power switch, such as voltage regulator 314 or 324, is turned on. This inrush current often happens when an information handling system, such as a server system, goes through a power state transition like that from S5 to S0. In an embodiment, the amount of inrush current depends on the capacitive loading on voltage regulators 314 and 324. For example, the more components and devices, the higher the inrush current. Power hungry devices like NICs, GPUs and FPGA accelerators, when turned on at the same time, may sink a very large current in a short amount of time and may potentially cause unwanted over-current events. Thus, controller 302 and voltage control circuitries 304 and 306 may improve information handling system 300 by optimizing the power-on sequence based on an electrical feedback qualifier signal. Operation of information handling system 300 will be described with respect to FIGS. 3 and 4.

During operation, controller 302 may receive a signal to power on one or more other devices or components within information handling system 300. In an example, controller 302 may receive a power-on request from any suitable component, such as BMC 150 of FIG. 1. In response to the request, controller 302 may provide any suitable signal to voltage regulator 314 through directed current block 310 and state hold up block 312 to provide an output voltage to power up device 308. In an example, controller 302 may provide the signal to directed current block 310 via a first pin of the controller. In certain examples, the operation of voltage control circuitries 304 and 306 may have the same result whether the signal is a logical high voltage or a low logic voltage as long as the signal is a variation from a voltage level on the voltage enable sense line during an off state of the voltage control circuitries. For clarity and brevity, the powering on devices 308 and 309 will be described with respect to the signal from controller 302 being a logical high voltage as shown by waveform 402 in FIG. 4. In an embodiment, waveform 402 represents the voltage level of a voltage enable sense line (V_enable_sense) connected to a pin of controller 302.

Referring back to FIG. 3, in response to receiving the logical high voltage, directed current block 310 may allow a forward transit of the logical high voltage to state hold-up 312. In an example, directed current block 310 may provide the logical high voltage to state hold-up 312 in any suitable manner, such as described with respect to FIG. 5 below.

Figure 4:
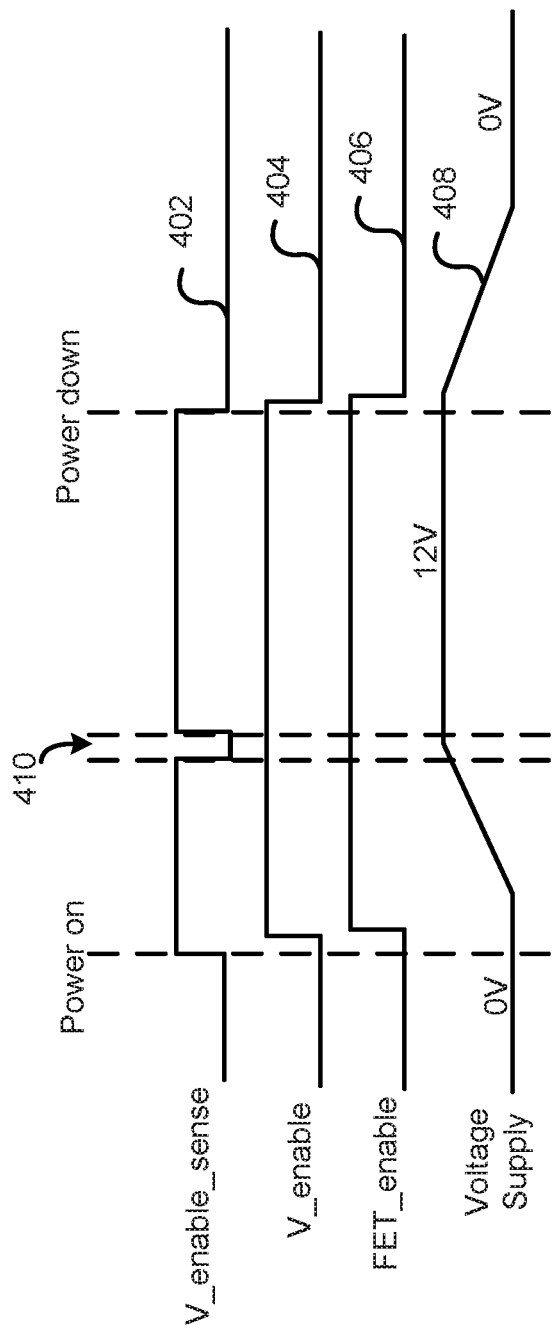
FIG. 4 is a diagram showing a group of signals associated with the portion of the information handling system of FIG. 3 according to at least one embodiment of the disclosure.

Referring now to FIG. 4, waveform 404 represents the voltage level of a voltage enable line (V_enable) coupled between directed current block 310 and state hold-up block 312. As shown in FIG. 4, waveform 404 transitions to a logical high voltage shortly after waveform 402 transitions to the logical high voltage. Thus, as described above, directed current block 310 allows the voltage level on voltage enable sense line to transit to the voltage enable line.

Referring back to FIG. 3, state hold-up block 312 may receive the logical high voltage signal on the voltage enable line. In response to receiving the logical high voltage, state hold-up block 312 may provide a logical high voltage on the transistor enable line (FET_enable) coupled between the state hold-up block 312 and voltage regulator 314. In an example, the logical high voltage on the FET_enable line may be represented by waveform 406 of FIG. 4. In an embodiment, the logical high voltage on the FET_enable line causes an output voltage from voltage regulator 314 to rise from 0 volt to a desired voltage level as represented by waveform 408 of FIG. 4. In an example, the desired voltage level may be constantly provided to voltage regulator 314, and the desired voltage level may be any suitable voltage, such as 6 volts, 12 volts, 24 volts, or the like. Voltage regulator 314 may provide the output voltage to device 308 and to pulse timer 316.

As the output voltage rises to the desired voltage level, there may be a short time interval or voltage level range that activates pulse timer 316. During the interval or particular voltage level range that pulse timer 316 is active, the pulse timer may pull the voltage level on the voltage enable sense line to a logical low voltage. For example, the interval is represented by the period of time 410 in FIG. 4, during which waveform 402 dips from the logical high voltage to a logical low voltage. In an example, controller 302 may include an open-drain driver connected to the pin, and the open-drain driver may have independent transmit and receive characteristics. In this example, controller 302, via the open-drain driver, may monitor the voltage enable sense line to determine whether the voltage level is pulled low. In response to a determination that the voltage level on the voltage enable sense line is low, controller 302 may detect that voltage regulator 314 has fully turned on and that the output voltage is at the desired voltage level. In an example, the reception or detection of the logical low voltage by controller 302 may be independent of the transmission of the logical high voltage signal to directed current block 310, such that providing of the logical high voltage to the directed current block 310, state hold-up block 312 and voltage regulator 314 is not disrupted by the reception of the logical low voltage. In an example, state hold-up block 312 may hold or maintain the logical high voltage on the FET_enable line for a period of time that is greater than the short interval or voltage level range that activates pulse timer 316 so that voltage regulator 314 may continue to provide the output voltage during this time period.

In response to receiving a power down request, controller 302 provides a logical low voltage on voltage enable sense line, as represented by waveform 402, which in turn causes, in any suitable manner, voltage regulator 314 to no longer provide the output voltage to device 308. For example, when controller 302 drives the voltage level on the voltage enable sense line to a logical low voltage, the logical low voltage signal may be passed through the directed current block 310 and may be kept at the logical low voltage for long enough to override the state of state hold-up block 312, and thus disable voltage regulator 314 by the voltage level on the FET_enable line being held at a logical low voltage. In response to FET_enable line being held at a logical low voltage, the output voltage provided to device 308 may deplete back to a low voltage level, which in turn is provided to as feedback to the voltage enable sense line. Based on controller 302 driving a logic low voltage on the voltage enable sense line and sensing a logic low voltage on the voltage enable sense line, the controller determines that the voltage supply to device 308 is at a desirable 0 volt.

In an additional example, controller 302 may utilize voltage control circuitry 306 to power on device 309. In this example, in response to controller 302 determining that the output voltage to device 308 is at the desired voltage level, the controller may provide a signal, such as a logical high voltage, to voltage regulator 324 through the directed current block 320 and state hold-up block 322 of voltage control circuitry 306. In an example, controller 302 may provide the logical high voltage to directed current block 320 in any suitable means including, but not limited to, a voltage enable sense line coupled between the directed current block and another pin of the controller. In an embodiment, directed current block 320, state hold-up block 322, voltage regulator 324, and pulse timer 326 operate to provide an output voltage to device 309 and acknowledge that the output voltage is at the desired voltage level in substantially the same manner as described above with respect to directed current block 310, state hold-up block 312, voltage regulator 314, and pulse timer 316. In this example, controller 302 may detect, via an open-drain driver coupled to the pin of the controller, the logical low voltage on the voltage enable sense line coupled between the pin and directed current block 320. In response detecting the logical low voltage in a particular time window, controller 302 may determine that output voltage from voltage regulator 324 is at the desired voltage level.

In an example, state hold-up block 312 and/or state hold-up block 322 may be implemented in any other suitable manner including, but not limited to, a capacitor and a hardware latch. In an example, if a state hold-up block is implemented with a capacitor, then the capacitor may be selected with an appropriate capacitive value to sustain the logical high voltage level to enable the voltage regulator and allow voltage output to the device.

One of ordinary skilled in the art would recognize that the disclosure described herein is not limited to powering on two devices, but may be extended to as many devices as separate pins included within controller 302 without varying from the scope of the disclosure.

Figure 5:
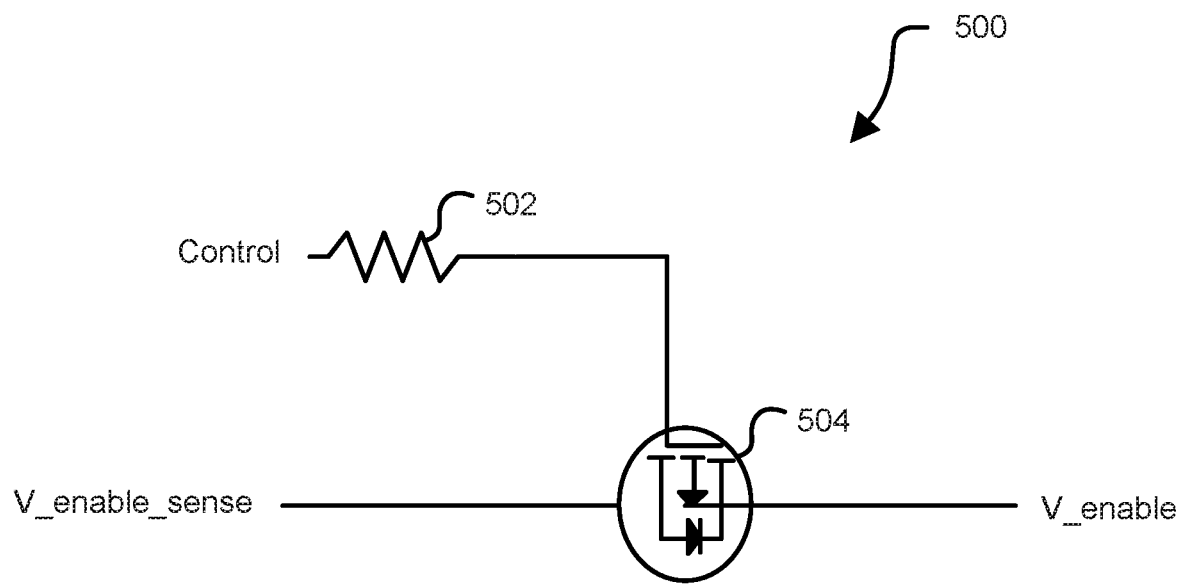
FIG. 5 is a schematic diagram of an exemplary circuit for a directed current block according to at least one embodiment of the disclosure.

FIG. 5 is a schematic diagram of directed current circuitry 500 according to at least one embodiment of the disclosure. In an embodiment, directed current circuitry 500 is the circuitry within directed current block 310 or 320 of FIG. 3. Directed current circuitry 500 may include additional components (not shown in FIG. 5), without varying from the scope of this disclosure. Directed current circuitry 500 includes a resistor 502 and a transistor 504. Resistor 502 includes a first terminal coupled to a control signal line, and a second terminal. Transistor 504 includes a first current electrode coupled to the voltage enable sense line, a second current electrode coupled to a voltage enable line, and a control electrode coupled to the second terminal of resistor 502. In an example, transistor 504 may be any suitable type of transistor including, but not limited to, a metal oxide semiconductor field effect transistor (MOSFET).

During operation, a system, such as BMC 150 of FIG. 1, may provide any suitable control signal to directed current circuitry 500. For example, the control signal may be a global control that turns on all directed current blocks within an information handling system at the same time. In an example, the control signal may be a dedicated control signal, such that each directed current block within an information handling system may be individually controlled. In an embodiment, the dedicated control signal enables transistor 504 to remain in an active mode so that the voltage level on voltage enable sense line is passed to the voltage enable line. In response to transistor 504 being in the active mode, when the voltage level on the voltage sense enable channel is a logical high voltage, a voltage level on the voltage enable line becomes a logical high voltage. Similarly, when the voltage level on the voltage sense enable channel is a low logic voltage, a voltage level on the voltage enable line becomes a low logic voltage.

Figure 6:
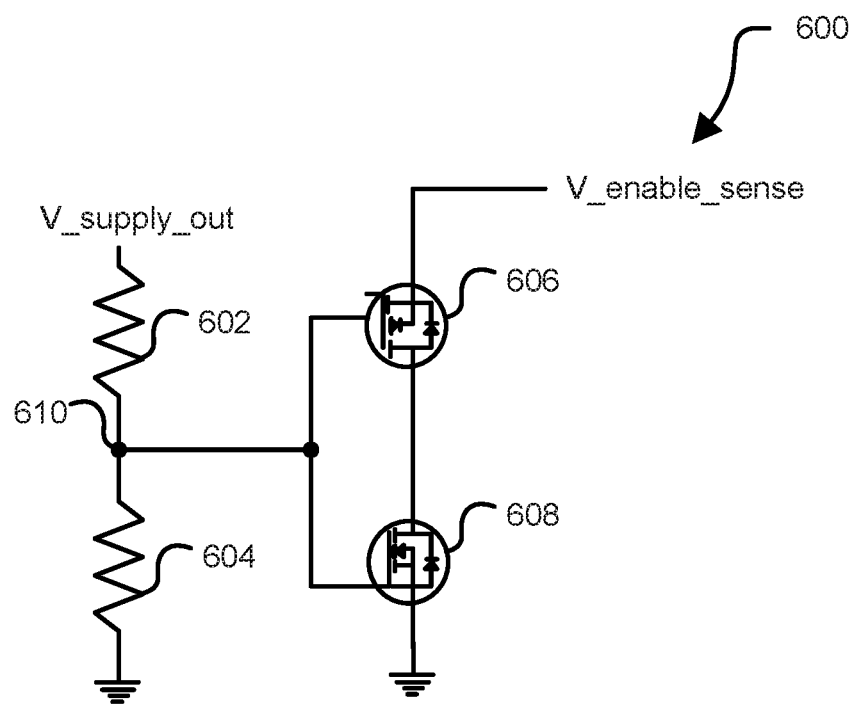
FIG. 6 is a schematic diagram of an exemplary circuit for a pulse timer according to at least one embodiment of the disclosure.

FIG. 6 is a schematic diagram of pulse timer circuitry 600 according to at least one embodiment of the disclosure. In an embodiment, pulse timer circuitry 600 is the circuitry within pulse timer 316 or 326 of FIG. 3. Pulse timer circuitry 600 may include additional components (not shown in FIG. 6), without varying from the scope of this disclosure. Pulse timer circuitry 600 includes resistors 602 and 604 and transistors 606 and 608. Resistor 602 includes a first terminal coupled to a voltage supply line, and a second terminal. Resistor 604 includes a first terminal coupled to the second terminal of resistor 602, and a second terminal coupled to a ground voltage terminal. In an embodiment, resistors 602 and 604 form a voltage divider between the voltage level of the voltage supply line and the ground voltage terminal. Transistor 606 includes a first current electrode coupled to the voltage enable sense line, a second current electrode, and a control electrode coupled to the second terminal of resistor 602. Transistor 608 includes a first current electrode coupled to the second current electrode of transistor 606, a second current electrode coupled to a ground voltage terminal, and a control electrode coupled to the second terminal of resistor 602. In an example, transistors 606 and 608 may be any suitable type of transistors including, but not limited to, MOSFETs. For example, transistor 606 may be a p-channel MOSFET and transistor 608 may be an n-channel MOSFET.

During operation, in response to the voltage level of the voltage supply line rising from 0V to a desired voltage, as described above with respect to FIGS. 3 and 4, the voltage level at node 610 between resistors 602 and 604 will rise based on the voltage divider characteristics of resistors 602 and 604. The voltage level at node 610 is provided to the control electrodes of transistors 606 and 608 to control the state of the transistors. In certain examples, a particular range of voltage levels at node 610 may cause both transistor 606 and 608 to be in a saturation mode, which in turn allows current to flow between the first current electrode and the second current electrode of the transistors. In response to transistors 606 and 608 being in the saturation mode, the voltage level on the voltage enable sense line will be pulled low based on the current flow through the transistors 606 and 608 to the ground voltage terminal.

Alternatively, in response to the voltage level at node 610 being outside of the particular range, such as a higher or low voltage level, one of transistors 606 and 608 will be off, such that no current will flow through the transistor. In this situation, the voltage level of voltage enable sense line will not be affected by pulse timer circuitry 600. Thus, as described above with respect to FIGS. 3 and 4, pulse timer circuitry 600 may pull the voltage level on voltage enable sense line low for only a predetermined amount of time. In an example, the predetermined amount of time may be designed based on the range of voltage levels that cause both transistors 606 and 608 to be in the saturation mode. For example, the larger the range of voltages that cause both transistors 606 and 608 to be in the saturation mode, the longer the predetermined amount of time that the voltage level of voltage enable sense line will be pulled low. Similarly, the smaller the range of voltages that cause both transistors 606 and 608 to be in the saturation mode, the shorter the predetermined amount of time that the voltage level of voltage enable sense line will be pulled low.

In alternative examples, pulse timer circuitry 600 may be implemented in any other suitable manner including, but not limited to, a discrete integrated circuit with different logic components.

Figure 7:
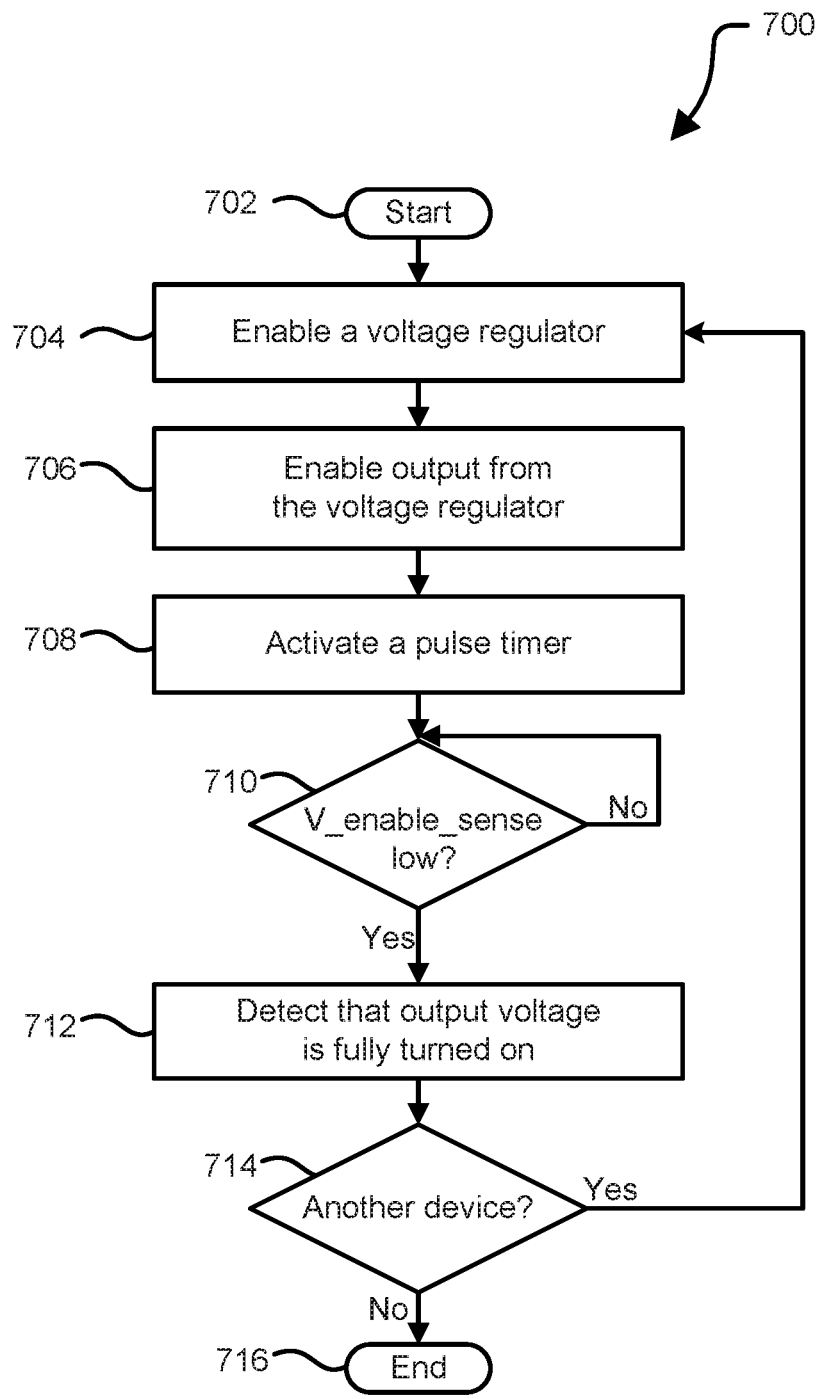
FIG. 7 is a flow diagram illustrating a method for isolating and removing a failed device from an information handling system according to at least one embodiment of the disclosure.

FIG. 7 is a flow diagram illustrating a method 700 for qualifying a power-on sequence based on feedback, starting at block 702. It will be readily appreciated that not every method step set forth in this flow diagram is always necessary, and that certain steps of the methods can be combined, performed simultaneously, in a different order, or perhaps omitted, without varying from the scope of the disclosure. At block 704, a voltage regulator is enabled. For example, a controller within an information handling system may provide a signal on a communication channel. In an embodiment, the communication channel is a voltage enable sense line coupled to an open-drain driver within the controller. In an example, the controller may be any suitable type of device including, but not limited to, a complex programmable logic device (CPLD). In certain examples, the signal provided on the communication channel may be a logical high voltage.

At block 706, an output from the voltage regulator is enabled. In an example, in response to the output being enabled, the voltage may ramp or rise from 0V to a desired voltage, such as 12V, 24V, or the like. At block 708, a pulse timer is activated. For example, the pulse timer may be activated during a short interval of time while the output rises from 0V to the desired voltage. In an example, the pulse timer may pull a communication channel, such as the voltage enable sense line, to a low logical level.

At block 710, a determination is made whether a voltage level of the voltage enable sense line is low. In response to the voltage enable sense line being pulled low, the output from the voltage regulator is detected as fully turned on at block 712. In an example, the voltage enable sense line may only be pulled low for the duration of a logical low pulse from the pulse timer. At block 714, a determination is made whether another device within the information handling system is to be powered on. In response to another device within the information handling system to be powered on, the method continues as described above with respect to block 704. Otherwise, the method ends at block 716.

Figure 8:
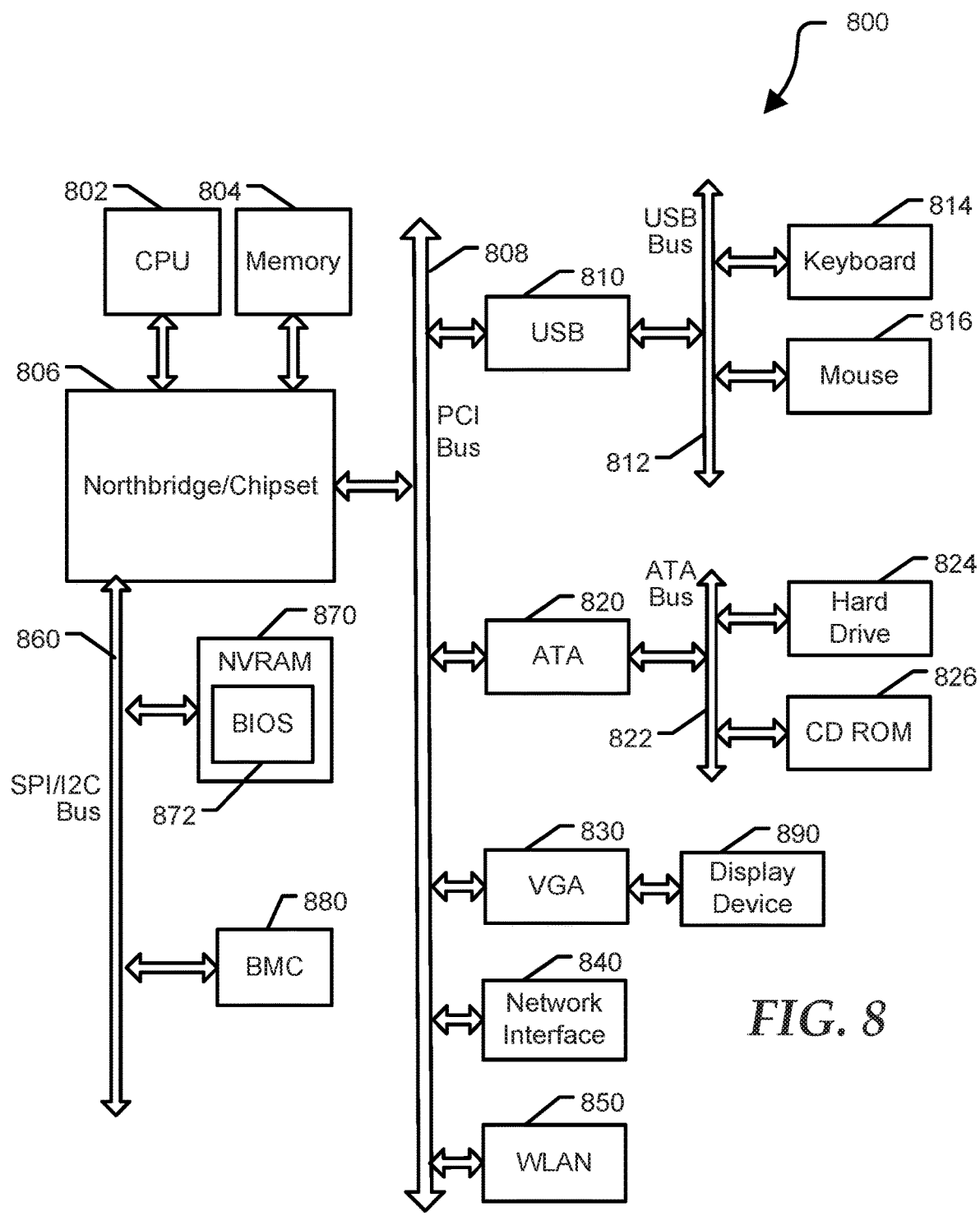
FIG. 8 is a block diagram of a general information handling system according to at least one embodiment of the disclosure.

FIG. 8 illustrates a general information handling system 800 including a processor 802, a memory 804, a northbridge/chipset 806, a PCI bus 808, a universal serial bus (USB) controller 810, a USB bus 812, a keyboard device controller 814, a mouse device controller 816, a configuration an ATA bus controller 820, an ATA bus 822, a hard drive device controller 824, a compact disk read only memory (CD ROM) device controller 826, a video graphics array (VGA) device controller 830, a network interface controller (NIC) 840, a wireless local area network (WLAN) controller 850, a serial peripheral interface (SPI) bus 860, a NVRAM 870 for storing BIOS 872, and a baseboard management controller (BMC) 880. In an embodiment, information handling system 800 may be information handling system 100 of FIG. 1. BMC 880 can be referred to as a service processor or embedded controller (EC). Capabilities and functions provided by BMC 880 can vary considerably based on the type of information handling system. For example, the term baseboard management system is often used to describe an embedded processor included at a server, while an embedded controller is more likely to be found in a consumer-level device. As disclosed herein, BMC 880 represents a processing device different from CPU 802, which provides various management functions for information handling system 800. For example, an embedded controller may be responsible for power management, cooling management, and the like. An embedded controller included at a data storage system can be referred to as a storage enclosure processor.

For purpose of this disclosure information handling system 800 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 800 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 800 can include processing resources for executing machine-executable code, such as CPU 802, a programmable logic array (PLA), an embedded device such as a System-on-a-Chip (SoC), or other control logic hardware. Information handling system 800 can also include one or more computer-readable medium for storing machine-executable code, such as software or data.

System 800 can include additional processors that are configured to provide localized or specific control functions, such as a battery management controller. Bus 860 can include one or more busses, including a SPI bus, an I2C bus, a system management bus (SMBUS), a power management bus (PMBUS), and the like. BMC 880 can be configured to provide out-of-band access to devices at information handling system 800. As used herein, out-of-band access herein refers to operations performed prior to execution of BIOS 872 by processor 802 to initialize operation of system 800.

BIOS 872 can be referred to as a firmware image, and the term BIOS is herein used interchangeably with the term firmware image, or simply firmware. BIOS 872 includes instructions executable by CPU 802 to initialize and test the hardware components of system 800, and to load a boot loader or an operating system (OS) from a mass storage device. BIOS 872 additionally provides an abstraction layer for the hardware, such as a consistent way for application programs and operating systems to interact with the keyboard, display, and other input/output devices. When power is first applied to information handling system 800, the system begins a sequence of initialization procedures. During the initialization sequence, also referred to as a boot sequence, components of system 800 are configured and enabled for operation, and device drivers can be installed. Device drivers provide an interface through which other components of the system 800 can communicate with a corresponding device.

Information handling system 800 can include additional components and additional buses, not shown for clarity. For example, system 800 can include multiple processor cores, audio devices, and the like. While a particular arrangement of bus technologies and interconnections is illustrated for the purpose of example, one of ordinary skilled in the art will appreciate that the techniques disclosed herein are applicable to other system architectures. System 800 can include multiple CPUs and redundant bus controllers. One or more components can be integrated together. For example, portions of northbridge/chipset 806 can be integrated within CPU 802. Additional components of information handling system 800 can include one or more storage devices that can store machine-executable code, one or more communications ports for communicating with external devices, and various input and output (I/O) devices, such as a keyboard, a mouse, and a video display. For example, device controller 830 may provide data to a display device 890 to visually present the information to an individual associated with information handling system 800. An example of information handling system 800 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

Information handling system 800 can include a set of instructions that can be executed to cause the information handling system to perform any one or more of the methods or computer based functions disclosed herein. The information handling system 800 may operate as a standalone device or may be connected to other computer systems or peripheral devices, such as by a network.

In a networked deployment, the information handling system 800 may operate in the capacity of a server or as a client user computer in a server-client user network environment, or as a peer computer system in a peer-to-peer (or distributed) network environment. The information handling system 800 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 800 can be implemented using electronic devices that provide voice, video or data communication. Further, while a single information handling system 800 is illustrated, the term "system" shall also be taken to include any collection of systems or sub-systems that individually or jointly execute a set, or multiple sets, of instructions to perform one or more computer functions.

The information handling system 800 can include a disk drive unit and may include a computer-readable medium, not shown in FIG. 8, in which one or more sets of instructions, such as software, can be embedded. Further, the instructions may embody one or more of the methods or logic as described herein. In a particular embodiment, the instructions may reside completely, or at least partially, within system memory 804 or another memory included at system 800, and/or within the processor 802 during execution by the information handling system 800. The system memory 804 and the processor 802 also may include computer-readable media.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a processor or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system, comprising:
  a voltage regulator configured to provide an output voltage to power on a device within the information handling system; and
  a controller including a voltage enable sense line, the controller configured to:
    provide a signal to enable the voltage regulator on the voltage enable sense line at a first voltage associated with a first state;
    monitor a voltage level on the voltage enable sense line;
    determine whether the voltage level of the voltage enable sense line has changed to a second voltage level associated with a second state; and
    in response to the voltage level on the voltage enable sense line changing to the second voltage level, detect that the output voltage is fully turned on and provided to the device.

2. The information handling system of claim 1, further comprising:
  a pulse timer to communication with the voltage regulator, the pulse timer to pull the voltage level on the voltage enable sense line to the second voltage level when activated, wherein the pulse timer is activated in response to a rise in the output voltage from the voltage regulator.

3. The information handling system of claim 1, wherein the controller includes:
  an open-drain driver with a pin to provide the signal to enable the voltage regulator.

4. The information handling system of claim 3, wherein the signal to enable the voltage regulator is a logical high level provided by the controller on the voltage enable sense line.

5. The information handling system of claim 4, wherein the pin further to receive the voltage level on the voltage enable sense line after the signal to enable the voltage regulator has been provided.

6. The information handling system of claim 1, wherein the device is a field-programmable gate array device.

7. The information handling system of claim 1, wherein the controller is a complex programmable logic device.

8. A method, comprising:
  providing, via a voltage enable sense line of a controller of an information handling system, a signal to enable a voltage regulator of the information handling system;
  in response to enabling the voltage regulator, enabling an output voltage of the voltage regulator, wherein the output voltage provides power to a device within the information handling system;
  monitoring, at a pin of the controller, a voltage level on the voltage enable sense line;
  determining whether the voltage level of the voltage enable sense line is at a predetermined voltage level; and
  if the voltage level on the voltage enable sense line is at the predetermined voltage level, then detecting, by the controller, that the output voltage is fully turned on and provided to the device, wherein the voltage enable sense line is changed to the predetermined voltage level for a time interval and then the voltage enable sense line returns to a previous voltage level.

9. The method of claim 8, further comprising:
  in response to a rise in the output voltage from the voltage regulator, activating a pulse timer within the information handling system; and
  pulling, by the pulse timer, the voltage level on the voltage enable sense line to the second voltage level.

10. The method of claim 8, wherein providing the signal to enable the voltage regulator comprises:
  providing, via an open-drain driver of the controller, the signal to enable the voltage regulator.

11. The method of claim 10, wherein the signal to enable the voltage regulator is a logical high level provided by the controller on the voltage enable sense line.

12. The method of claim 11, further comprising:
receiving, via the pin, the voltage level on the voltage enable sense line after the signal to enable the voltage regulator has been provided.

13. The method of claim 8, the device is a field-programmable gate array device.

14. The method of claim 8, wherein the controller is a complex programmable logic device.

15. An information handling system, comprising:
a first voltage regulator configured to provide a first output voltage to power on a first device within the information handling system;
a second voltage regulator configured to provide a second output voltage to power on a second device within the information handling system; and
a controller including first and second voltage enable sense lines, the controller configured to:
provide a first signal to enable the first voltage regulator on the first voltage enable sense line at a first voltage associated with a first state;
monitor a voltage level on the first voltage enable sense line;
determine whether the voltage level of the first voltage enable sense line has changed to a second voltage level associated with a second state; and
in response to the voltage level on the first voltage enable sense line changing to the second voltage level, wherein the first voltage enable sense line is changed to the second voltage level for a time interval and then the first voltage enable sense line returns to the first voltage level, the controller to:
detect that the first output voltage is fully turned on and provided to the first device; and
provide a second signal to enable the second voltage regulator on the first voltage enable sense line at the first voltage associated with the second state, wherein the first signal and the second signal are provided via different pins of the controller.

16. The information handling system of claim 15, further comprising:
a pulse timer to communication with the first voltage regulator, the pulse timer to pull the voltage level on the first voltage enable sense line to the second voltage level when activated, wherein the pulse timer is activated in response to a rise in the first output voltage from the first voltage regulator.

17. The information handling system of claim 15, wherein the controller includes:
an open-drain driver with a pin to provide the first signal to enable the first voltage regulator.

18. The information handling system of claim 17, wherein the first signal to enable the first voltage regulator is a logical high level provided by the controller on the first voltage enable sense line.

19. The information handling system of claim 18, wherein the pin further to receive the voltage level on the first voltage enable sense line after the first signal to enable the first voltage regulator has been provided.

20. The information handling system of claim 15, wherein the first device is a field-programmable gate array device and the controller is a complex programmable logic device.

* * * * *